(12) United States Patent
Haefeli

(10) Patent No.: US 9,277,337 B2
(45) Date of Patent: Mar. 1, 2016

(54) GENERATING AN ADAPTED AUDIO FILE

(75) Inventor: Oliver Haefeli, Zumikon (CH)

(73) Assignee: My Tinnitus has gone AG, Zurich (CH)

( * ) Notice: Subject to any disclaimer, the term of this patent is extended or adjusted under 35 U.S.C. 154(b) by 121 days.

(21) Appl. No.: 14/235,541

(22) PCT Filed: Jul. 28, 2011

(86) PCT No.: PCT/CH2011/000174
§ 371 (c)(1),
(2), (4) Date: Jun. 10, 2014

(87) PCT Pub. No.: WO2013/013326
PCT Pub. Date: Jan. 31, 2013

(65) Prior Publication Data
US 2014/0288685 A1    Sep. 25, 2014

(51) Int. Cl.
*G06F 17/00*    (2006.01)
*H04R 25/00*    (2006.01)
*G06F 17/30*    (2006.01)

(52) U.S. Cl.
CPC ............ *H04R 25/75* (2013.01); *G06F 17/3074* (2013.01)

(58) Field of Classification Search
CPC ...... H04R 25/75; H04R 25/70; H04R 25/552; H04R 2225/39; H04R 2420/07; H04R 5/033; H04R 5/04
See application file for complete search history.

(56) References Cited

U.S. PATENT DOCUMENTS

| | | | |
|---|---|---|---|
| 9,020,621 B1* | 4/2015 | Proctor et al. | 700/94 |
| 2005/0260985 A1* | 11/2005 | Rader et al. | 455/432.3 |
| 2007/0133832 A1 | 6/2007 | DiGiovanni et al. | |
| 2010/0158262 A1 | 6/2010 | Schumaier et al. | |

FOREIGN PATENT DOCUMENTS

| | | |
|---|---|---|
| WO | 00/56120 | 9/2000 |
| WO | 2008087157 | 7/2008 |
| WO | 2011127930 | 10/2011 |

OTHER PUBLICATIONS

"Listening to tailor-made notched music reduces tinnitus loudness and tinnitus-related auditory cortex activity" Hidehiko Okamoto et al., Proceedings of the National Academy of Sciences of the United States of America (PNAS), 107(3), Jan. 19, 2010, retrieved and accessed on the Internet http://www.pnas.org/content/107/3/1207.full.pdf, pp. 1207-1210.
PCT International Search Report in connection with PCT/CH2011/000174, completed on Mar. 22, 2012 and mailed Mar. 30, 2012.

* cited by examiner

*Primary Examiner* — Andrew C Flanders
(74) *Attorney, Agent, or Firm* — Cooper & Dunham LLP

(57) ABSTRACT

The present idea refers to an apparatus for generating an adapted audio file. The apparatus comprises an identification unit (51) for supporting identification of a frequency range (fr) associated with an auditory disorder of a user of the apparatus, and an adaptation unit (52) for adapting a frequency characteristic of an audio file (af) representing a track of music which adaptation is subject to the identified frequency range (fr). An audio player (6) is provided for playing the adapted audio file (aaf).

15 Claims, 5 Drawing Sheets

GENERATING AN ADAPTED AUDIO FILE

CROSS-REFERENCE TO RELATED APPLICATIONS

This application is a 371 national stage of PCT International Application No. PCT/CH2011/000174, filed Jul. 28, 2011, the entire contents of which is hereby incorporated by reference into this application in its entirety.

TECHNICAL FIELD

The idea relates to an apparatus and a method for generating an adapted audio file, and to a corresponding computer program element.

BACKGROUND ART

Despite of increased research focused on the tinnitus phenomenon and related therapies, the tinnitus phenomenon still is not fully understood and therapies mostly relate to fighting symptoms rather than cause.

A promising approach was introduced in "Listening to tailor-made notched music reduces tinnitus loudness and tinnitus-related auditory cortex activity" by Hidehiko Okamoto et al., Proceedings of the National Academy of Sciences of the United States of America (PNAS), 107(3), Jan. 19, 2010, retrieved and accessed on the Internet http://www.pnas.org/content/107/3/1207.full.pdf on Jun. 7, 2011.

According to this paper, the cause of the tinnitus phenomenon may rather be found in neuronal cortex activities than elsewhere. In a central auditory region, auditory cortex neurons may be deprived from excitation due to hearing loss centered around a given frequency, i.e. these neurons may no longer be excited as a result of a sound impact corresponding to the frequency associated with the hearing loss. However, in the following these neurons may become sensitive to neighboring frequencies because of a rewiring of these neurons to neighboring auditory regions in the cortex. This effect may be understood as maladaptive auditory cortex reorganization. A synchronized spontaneous neural activity in such region may cause the tinnitus for the reason that such auditory regions may be characterized by less lateral inhibitory networks. When now exposing the patient to music with the tinnitus frequencies being notched in the music, the neurons corresponding to the tinnitus frequencies may be retrained in order to reduce their maladaptive auditory cortex reorganization.

DISCLOSURE OF THE INVENTION

Hence, it is a general object of the invention to provide an apparatus and a method for generating an adapted audio file according to a user preference in music and allowing to react to changes in the characteristics of the auditory disorder of the user.

According to a first aspect of the present invention, an apparatus is provided for generating an adapted audio file. The apparatus comprises an identification unit for supporting identification of a frequency range associated with an auditory disorder of a user of the apparatus, and an adaptation unit for adapting a frequency characteristic of an audio file representing a track of music wherein the adaptation is subject to the identified frequency range. In addition, an audio player is provided for playing the adapted audio file.

The idea is based on the insight that a patient suffering from an auditory disorder, such as the above mentioned tinnitus, may experience varying hearing conditions over time or, for the specific auditory disorder of tinnitus, may experience a varying tinnitus frequency over time, for example. In order to avoid repeating visits at doctors and/or specialists for hearing aids of any kind, the present apparatus allows for a user him/herself to identify the tinnitus characteristics with support from the apparatus. Such support may, for example, include the identification unit controlling the audio player to play various sound samples, the sound samples being different from each other in at least one parameter such as frequency or frequency range, volume, or sound characteristic. In this way, the apparatus allows for outputting sound samples to the user which the user may want to compare to its tinnitus perception. In an embodiment, the apparatus may be programmed to sequentially output sound samples with increasing or decreasing frequency waiting for the user to confirm via an arbitrary input means the sound sample that matches best his/her tinnitus perception. The sound samples may not only vary in frequency but also in volume or in a combination of both. In addition, or separate from the foregoing, the sound samples may also vary in a characteristic of the sound. A sound characteristic may, for example, describe the basic appearance of a sound. Examples of sound characteristics may be noise, whistling, buzzing, etc.

In this context, the apparatus may support the identification of the tinnitus frequency range the user is exposed to by providing sound samples that either are prefabricated and preferably are stored in form of digital sound samples in a memory of the apparatus, and are played to the user via the audio player, or by providing sound samples that are built on the fly from one or more basic sound samples by means of interaction with the user. In the first embodiment, the user may be asked via input means, such as a touch-screen, to confirm, reject or modify the present sound sample. Once a sound sample is confirmed by the user, the apparatus may take the frequency range of this sound sample as a representation of the tinnitus frequency range that the user is perceiving. In the latter embodiment, starting from a basic sound sample played to the user, the user may, again preferably via a suitable input means such as a touchscreen, indicate in which way the basic sound sample shall be modified in order to better match the tinnitus perception. Such indication may be expressed by a request for one of a higher or deeper sound in terms of frequency, a higher or lower volume, or a different sound characteristic. A suitable interface for such interaction may be a touch-screen including a display with input buttons displayed. In response to such input, the apparatus may automatically modify the basic sound sample accordingly, e.g. by applying different filter settings to the basic sound sample and may output the modified basic sound sample to the user.

Applying different filter settings may be realized by tuning an equalizer or, more generally, a sound modifier of the apparatus, and specifically tuning an equalizer or sound modifier of the audio player. The above routine may iteratively be repeated until the user confirms one of the modified basic sound samples as the sound sample that best matches his/her tinnitus perception.

In another embodiment, new or different sound samples may not be built on the fly from a basic sound sample, but instead may be taken from a sound sample database stored in the apparatus or in an external memory attachable to the apparatus. In this scenario, the user input may include one or more of confirmation or rejection of the present sound sample, or request for a next sound sample. The interface of the identification unit to the user may preferably include a display which supports the user input and preferably offers selections. Such selection options may be adaptive subject to the stage the identification process has reached. For example, once the user may have confirmed a frequency range equivalent to the tinnitus perception, subsequent input options may refer to the volume and the characteristic of the sound only. A subsequent input option may also, or additionally refer to a finer scale of a frequency range selected in the first step for identifying the subject frequencies at higher resolution. In an alternate embodiment, the identification unit automatically plays a multitude of sound samples in a predefined sequence, and the user may confirm the sound sample that matches his/her tinnitus perception best, for example, by pressing a button.

In this respect the identification unit may not necessarily identify the tinnitus characteristics in a fully automated manner but may provide significant support especially in providing sound samples to the user for comparing to the tinnitus perception, and may provide an interaction interface to the user requesting for at least one of a confirmation, rejection or modification of the present/most recent sound sample.

In the present context, a frequency range describing the tinnitus perception, or being assigned to a sound sample, or being applied to an audio file later on, may preferably include either a single frequency, or multiple neighboring frequencies, preferably in the audible range. As such, the frequency range shall primarily represent the tone pitch of the tinnitus sensed by the user irrespective if it is a single tone pitch or a combined tone pitch covering multiple frequencies.

The audio player as a component of the apparatus may be implemented in software, hardware, firmware, or a combination of, and be suitable for playing audio files, and preferably digitally stored audio files. The audio player may include a D/A converter for converting a digital audio stream generated while reading the digital audio file into an analogue signal supplied to speakers integrated into the apparatus, or to earphones or to speakers connectable to the apparatus.

The one or more sound samples including a basic sound sample may be provided by the apparatus in digital from and as such may be stored in a digital file format such as wav, mp3, mp4 or others.

The one or more audio files representing one or more music tracks may be available in the same format such as wav, mp3, mp4 or others. While the sound samples may specifically be designed for supporting an identification of the tinnitus and as such may for example consist of single frequency events or defined noise spectrums, the audio files preferably represent music tracks of any kind enjoyable to listen to according to preferences of the user. Such audio files may be downloadable from the internet, or may be stored on other media such as CD, DVD or others.

When having identified the relevant frequency range, one or more audio files may be adapted subject to the identified frequency range. In a first scenario, and based on the "Listening to tailor-made notched music reduces tinnitus loudness and tinnitus-related auditory cortex activity"-paper, the identified frequency range may be suppressed in the frequency band of the audio file. In this sense, the frequency spectrum of the audio file will be adapted by filtering out the identified frequency range. In such sense, the adaptation unit may represent a band elimination filter characteristic acting on the audio file for generating the adapted audio file.

In another embodiment, the adaptation unit may comprise additional computational capacity for deriving a more sophisticated frequency characteristic from the identified frequency range to be applied to the audio files, e.g. by smoothening edges of the identified frequency range and applying a frequency characteristic with slowly rising and falling slopes instead of sharp edges limiting the identified frequency range. In a different embodiment, the adaptation unit may accentuate the frequencies at the edges of the subject band. The adaptation unit may in particular be a filter unit, and may be implemented in software, hardware, firmware, or a combination of. A transfer function of the frequency characteristic may be defined by means of filter coefficients, and the adaptation unit may apply an algorithm for deriving suitable filter coefficients from the identified frequency quency range. Such algorithm may take into account "listenablility" of the music and as such maintain an enjoyable version of the music track despite of cutting a frequency range out of it.

Applying the resulting frequency characteristic to the audio file may occur on the fly, i.e. the adaptation may be realized in the audio player, for example by means of an equalizer or a sound modifier, and may modify each audio stream generated out of an audio file. In this scenario, the adaptation unit may apply corresponding equalizer or sound modifier settings. In this scenario, the adaptation unit may apply the settings to the equalizer or sound modifier only when such mode is selected by the user. In a very preferred embodiment, the settings may only be applied to a set of audio files selected by the user. In such embodiment, the user may select only the music tracks he/she is comfortable with which may enhance relief from the tinnitus.

In another scenario, the adaptation unit may be applied to the audio file offline from playing the associated music track. In this scenario, in response to selecting one or more audio files from preferably all audio files available the selected audio files are adapted subject to the identified frequency range, and the adapted version of the audio file, i.e. the adapted audio file, is stored, preferably in a memory of the apparatus.

The selector for selecting the audio files to be manipulated may contain an interface, for example, that offers to the user one or more of title, interpret, album, etc. The user may select the audio files of choice, for example, by means of touching an associated region on a touch-screen. Hence, the apparatus may hold the original version of the audio file and its adapted version. Hence, the user may at any time select which version to listen to, for example by means of a second selector, again, preferably in form of an interface such as a touch-screen. The adaptation unit in this embodiment preferably is implemented as a digital filter unit. The equalizer or sound modifier mentioned above may be embodied in digital or analogue form for tuning frequencies in the audio spectrum.

In another embodiment, a third selector may be available for selecting between playing audio files or playing adapted audio files in response to activating the audio player. By this means, the respective mode can be adjusted when starting the audio player.

Preferably, the apparatus is a stand alone mobile electronic device containing the identification unit, the frequency modifier and the audio player in a common housing of the mobile electronic device. Such mobile electronic device may, for example, be a mobile phone, and specifically a smartphone, a portable audio player, or a portable computing device. Today's smartphones may be an ideal choice for implementing all the functions of the apparatus for the reason that sufficient computational power is provided for implementing the identification unit and the adaptation unit, that an enhanced user interface is provided in form of a touchscreen which facilitates interaction with the user in identifying the tinnitus characteristics. In addition, most of today's smartphones include an audio player function as such. Portable audio players, such as MP3™ players or Apples™ iPod™ offer computational power as well as user interfaces to be adapted/modified for implementing the present idea. So do portable computational devices, such as notebooks, netbooks, handhelds or tablet computers.

According to another aspect of the present invention, a method is provided for generating an adapted audio file in a mobile electronic device. An identification of a frequency range associated with an auditory disorder of a user is supported. A frequency characteristic of an audio file representing a track of music is adapted subject to the identified frequency range. The adapted audio file is played. Preferably, all these steps are executable by the mobile electronic device.

Preferably, the step of identifying the frequency range includes playing one or more sound samples to the user and in response to receiving a user input determining the frequency range.

The step of adapting the frequency characteristic of the audio file preferably includes filtering the audio file in the identified frequency range, and preferably includes suppressing the identified frequency range in the audio file.

According to another aspect of the present invention, a computer readable element is provided comprising computer readable code means for performing a method according to any one of the above embodiments when executed on a processing unit of the electronic mobile device. Specifically, the computer readable element may be a so called "app" which may be distributed for installation on a smartphone.

In a preferred embodiment, the computer readable element may be stored on a computer readable medium such as a harddisk, a solid state memory or any other storage medium. The computer readable medium may be a medium within the mobile electronic device, i.e. resident in the target device where the application represented by the computer program element shall be executed/running. In an alternate embodiment, the computer readable medium may be part of a server system or storage system connected to a server system for holding the application represented by the computer readable element available for downloading to users via a suitable transmission network, such as the internet, or a wireless data network such as 3G.

In another preferred embodiment, a medium is provided for making such computer program element available for downloading. Preferably, such medium may be a server offering the application represented by the computer program element. The medium may additionally comprise a transmission network such as the internet, or a wireless data network such as 3G.

And finally, an electrical transmission signal is provided representing such a computer readable element during transmission, preferably during transmission from a server to the mobile electronic device.

The above embodiments may support the treatment of auditory disorders such as tinnitus, but not limited to, in that the user may be free in applying a frequency characteristic to any music track preferred. The choice of preferred music may support the treatment in that a comfortable atmosphere may improve cure. In addition, such adapted music may permanently be available to the user for listening to. And the user may immediately react to changed hearing characteristics, such as to a shifted frequency or a reduced loudness in the case of tinnitus, by measuring the frequency range from new supported by the present apparatus, and may immediately apply the results of such measurement to the preferred music tracks by having applied a new frequency characteristic determined to the music tracks. In this sense, the apparatus encompasses a compact device for improving auditory disorders. Such stand alone device not only is capable of playing music adapted to the hearing disorder, but also is capable of supporting the identification of a frequency range associated with the auditory disorder, to monitor the frequency range over time, and to adapt the preferred music tracks in accordance with the identified frequency range. Especially, the measuring of the auditory disorder may be executed multiple times at the users discretion and as such may provide better measurements results caused by the user not being exposed to potentially stressful situations at the doctors and as a result the user possibly being more sensitive to the measuring. In addition, auditory disorders may show periods in which they disappear or are reduced in appearance. Such periods may be excluded from measurement since the measuring device permanently is available.

In a preferred embodiment, the apparatus is adapted to record a history of frequency ranges identified over time. Individual frequency ranges or such history may be exported or transmitted to external parties such as doctors, hearing aid providers, etc. By means of such history, a course of treatment may be monitored and corrective action may be taken. Such history, which may be represented by a sets of data, each set, for example, including a time stamp, a user id and an identified frequency range, may electronically be transmitted automatically or on demand to a doctors IT system and allow the doctors to monitor and react to the data transmitted.

In an alternate embodiment, a data set and/or history may be transmitted electronically to a receiver in the internet, such receiver representing a progress monitoring service offered to users of the apparatus, for example. Such service may evaluate the data received and send recommendations or advice to the user in how to improve usage of the apparatus. Such recommendations, may, for example, include recommendations to more or less often identify the frequency range, or others. In such way, the present application in the apparatus may in a preferred embodiment be used interactively with a doctors or other third party.

In another embodiment, the identification unit may additionally ask the user for his/her general condition/mood/mental state, e.g. by means of requesting for input on a scale. Such information may be linked to the identified frequency range, and may allow a better monitoring of the overall state of the user and/or provide additional information in how to improve treatment. Such information may additionally be included in a set of data referred to above.

The described embodiments similarly pertain to the apparatus, the method, the computer program element, the computer readable medium, the medium for making a computer program element available for downloading, and the electrical transmission signal. Synergetic effects may arise from different combinations of the embodiments although they might not be described in detail.

Further on it shall be noted that all embodiments of the present invention concerning a method might be carried out in the order of the steps as described or in any other order. The disclosure and scope of the invention shall include any order of steps irrespective of the order listed in the claims.

BRIEF DESCRIPTION OF THE DRAWINGS

The embodiments defined above and further features and advantages of the present invention can also be derived from the examples of embodiments described hereinafter which are explained with reference to the attacked drawings. In the drawings, the figures show.

MODES FOR CARRYING OUT THE INVENTION

Figure 1:
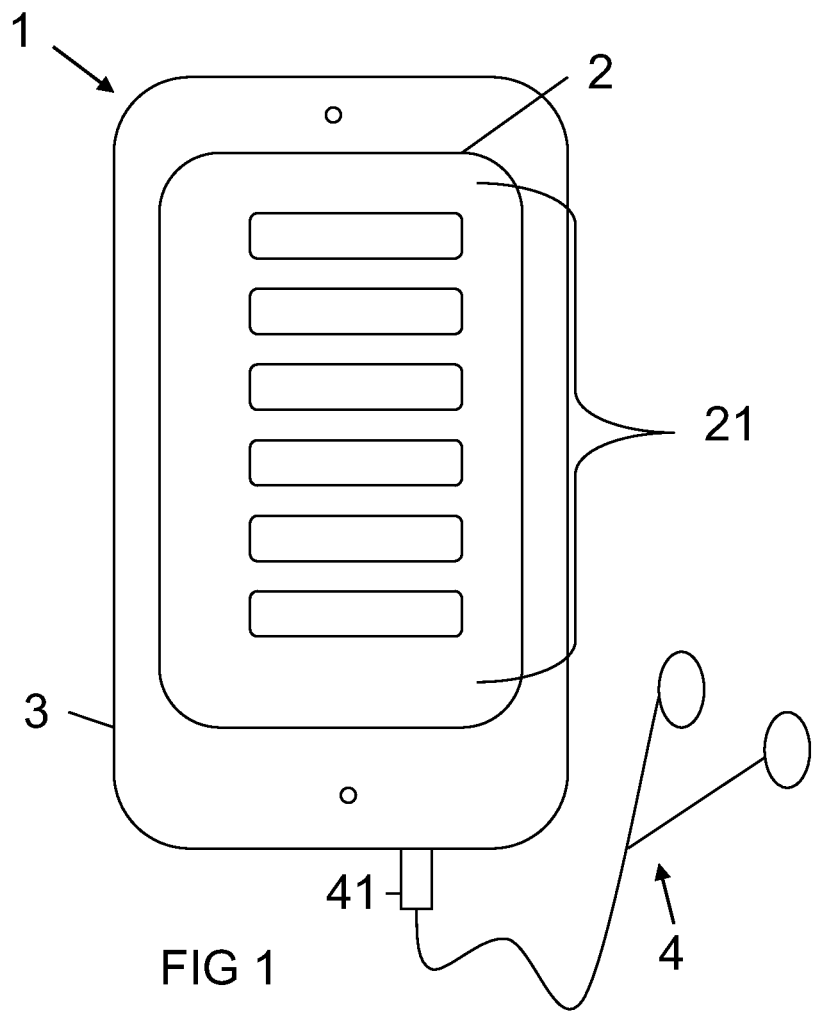
FIG. 1 a schematic view of a mobile phone according to an embodiment of the present invention, FIG. 2 to FIG. 5 block diagrams of various components of an apparatus according embodiments of the present invention, FIG. 6 filter characteristics applicable to audio files according to embodiments of the present invention, FIG. 7 a block diagram of a portable electronic device according to an embodiment of the present invention, FIG. 8 a system containing a medium for downloading software according to an embodiment of the present invention, FIG. 9 a flow chart of a method according to an embodiment of the present invention, and FIGS. 10-10c subroutines of the method as illustrated in FIG. 9.

Similar or relating components in the several figures are provided with the same reference numerals.

FIG. 1 illustrates a schematic view of a mobile phone according to an embodiment of the present invention. The mobile phone 1 is a smartphone comprising a display 2 which constitutes an interface 21 to the user. The mobile phone 1 i.a. contains a housing 3 and a plug 41 for earphones 4.

Figure 2:
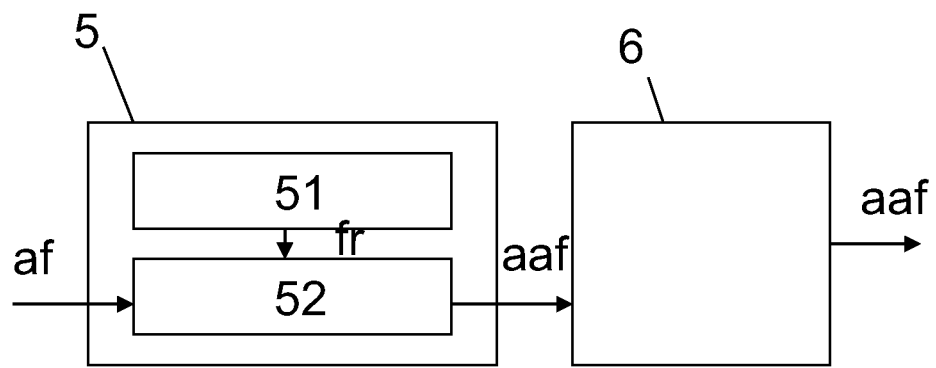

FIG. 2 to FIG. 5 illustrate block diagrams of components of an apparatus according embodiments of the present invention. In FIG. 2 a software engine 5 includes an identifying unit 51 and an adaptation unit 52 both of which may act on an audio player 6. The identification unit 51 supports identifying, for example, a frequency range <fr> of a user tinnitus. The frequency range <fr> is input to the adaptation unit 52 which converts the frequency range <fr> in a frequency characteristic, which in this specific embodiment is a filter characteristic, or builds a frequency characteristic based on the identified frequency range <fr>. Such frequency characteristic is applied by the adaptation unit 52 to an audio file <af>, which preferably is stored in a memory of the apparatus. The filtered audio file <aaf>, also called adapted audio file <aaf> is input to the audio player 6 for being played to the user. Playing the adapted audio file <aaf> may be initiated by triggering the process of modifying audio files <af> accordingly, or may be initiated by a user independent from the building of the adapted audio files <aaf> at any later point in time.

Figure 3:
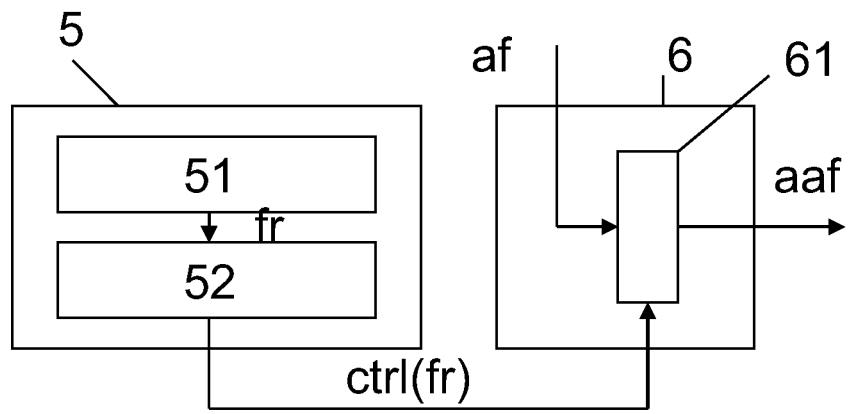

In the block diagram of FIG. 3 a different way is illustrated for adapting audio files <af>. Such way may be denoted as "on the fly" adaptation in that a sound modifier 61 of the audio player 6 is controlled by the adaptation unit 52 by means of a control signal <ctrl(fr)> for implementing the frequency characteristic that is derived from the identified frequency range <fr>. The sound modifier 61 tunes the audio file <af> while playing it accordingly such that the adapted audio file <aaf> may be played to the user by the audio player 6. In this embodiment, it may not be necessary to store the adapted audio files <aaf> in the electronic device, and only the audio files <af> may be stored as is the frequency characteristic based on the identified frequency range fr.

Figure 4:
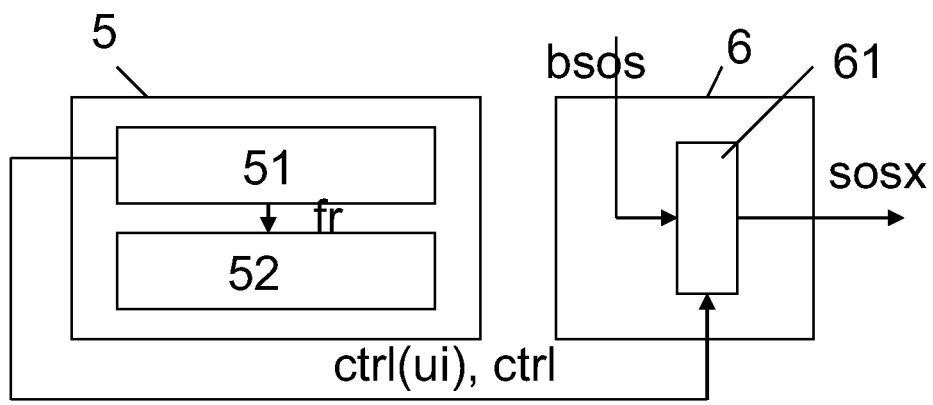

FIG. 4 shows another block diagram which focuses on the generation of sound samples <sosx> rather than adapted audio files <aaf>. A basic sound sample <bsos> may be stored in the apparatus, and for supporting identification of the relevant frequency range <fr>, the identification unit 51 controls a sound modifier 61 of the audio player 6 by control signal <ctrl(ui)> for generating a sound sample <sosx> out of a basic sound sample <bsos>. The control signal <ctrl(ui)> is subject to the user input <ui> which may denote a modification such as frequency up or frequency down with respect to the most recent sound sample <sosx> played. The identification unit 51 translates such user input <ui> into the control signal <ctrl(ui)> for adjusting the sound modifier settings for, for example, generating a sound sample <sosx+1> from basic sound sample <bsos> that has a higher tone than the previous sound sample <sosx> played. In an alternate embodiment, a control signal <ctrl> makes the sound modifier 61 play sound samples <sosx> in a defined order.

Figure 5:
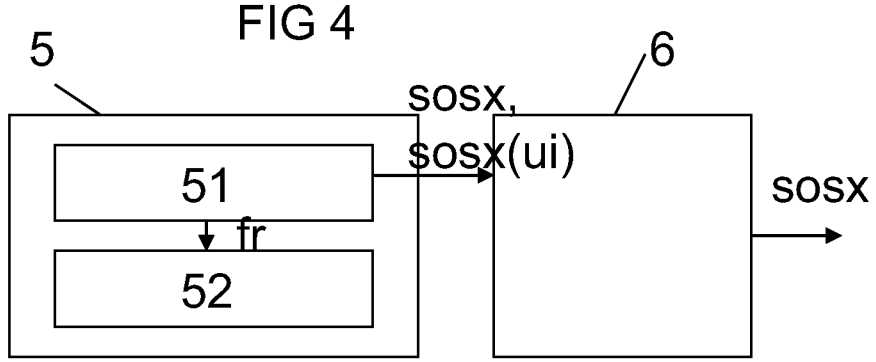

FIG. 5 illustrates another block diagram which focuses on the generation of sound samples <sosx>. In this example, the apparatus holds multiple different sound samples <sosx> that can be selected for being played by the audio player 6 by the identification unit 51. The selection may follow a defined order of sound samples <sosx>, e.g. by rising frequency, or may depend on the user input <ui> which may be translated by the identification unit 51 into the right choice of sound sample <sosx(ui)> to be played next.

Figure 6:
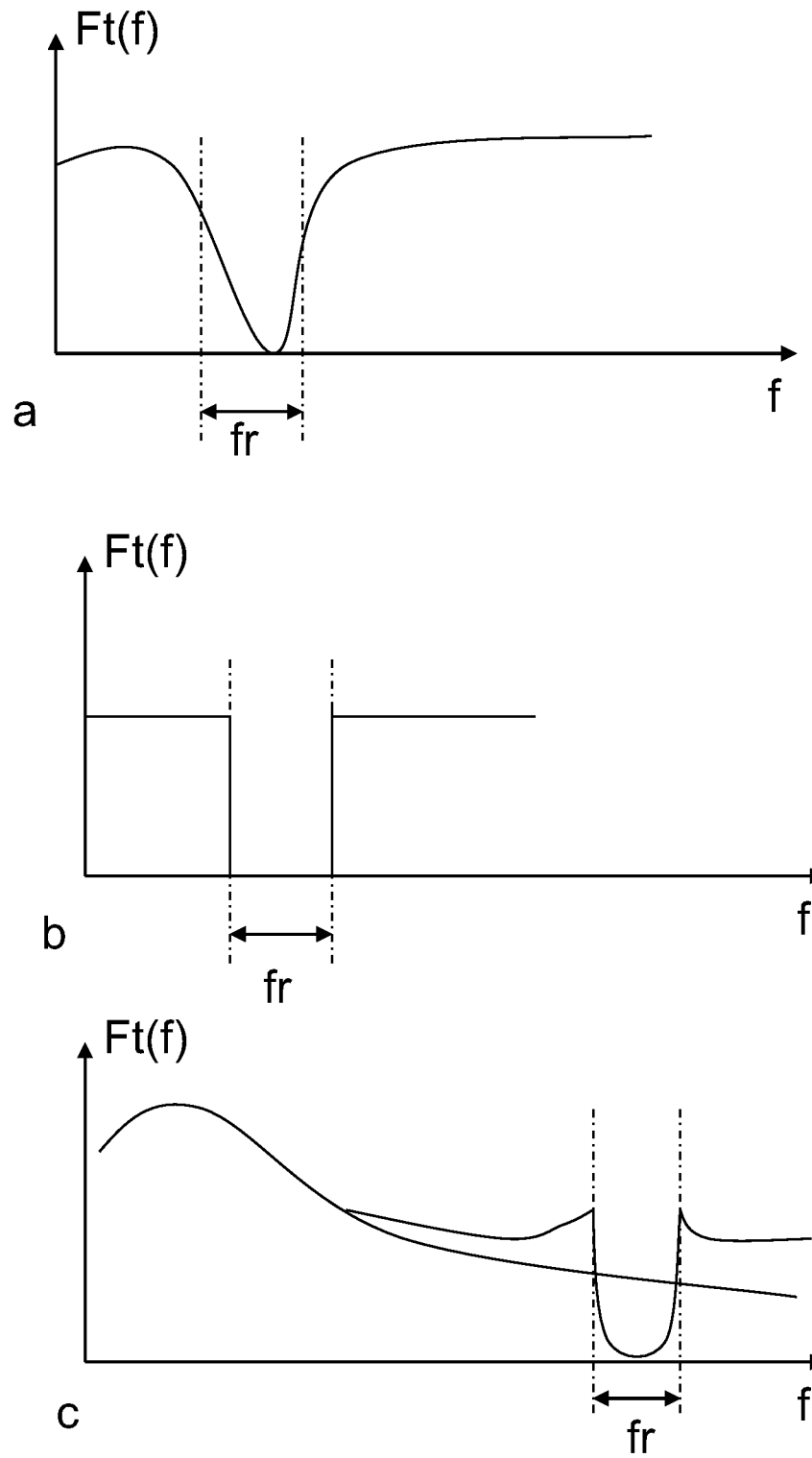

Once the frequency range <fr> associated to the auditory disorder is determined, a frequency characteristic of the one or more selected audio files <af> may be adapted according to the frequency range <fr> determined. A sample frequency characteristic <Ft(f)> to be applied to an audio file <af> is shown in FIG. 6a, in which <f> denotes the frequency. In the present example, the frequency characteristic <Ft(f)> may be interpreted as a band elimination filter characteristic filtering out frequencies around the identified frequency range <fr> with smoothed edges. FIG. 6b shows a different frequency characteristic in form of a filter characteristic in which the band elimination in the frequency band shows sharp edges. FIG. 6c shows a further frequency characteristic in the upper curve in which the edges of the band elimination are accentuated. Applying adaptations to short frequency ranges such as to the edges of the band elimination does not affect the music too much but provides a valuable effect on the auditory disorder. In addition, in the present example of a frequency characteristic Ft(f) according to FIG. 6c, the entire high level frequencies are raised for the reason that in such range the user's hearing may not be the best due to hearing loss or other reasons, while the music to be played may not contain too much shares in this region either. Such rise in the frequency characteristic may best be illustrated by comparison to the lower curve representing a non-risen frequency characteristic. This is why preferably a frequency region representing high audible frequencies such as from 7 kHZ to 15 kHZ or more may be amplified in order to maximize the effect of the adapted audio files with respect to the hearing loss of the user.

It is appreciated, that such modification to the frequency characteristic is not limited to an adaptation in the high frequency range but may also be applicable to low or medium portions of the audible frequency range. Any such adaptation/modification applied may either increase or lower associated frequencies. By means of adapting the frequency characteristic also outside the frequency range identified, other auditory disorders may be addressed such as hearing loss. For identifying such other auditory disorders, the present apparatus may be used, for example, as a device for identifying such other auditory disorders. In a preferred embodiment, the apparatus may be adapted for executing an audiometry. In such audiometry, sound samples representing different frequencies may be played to the user via the audio player. The user is requested to indicate via a suitable interface—e.g. by pressing a button—the point in time he/she hears the sound sample. Summarizing the users responses over the audible frequency range delivers an audiogram of the user indicating his/her hearing capability in form of hearing loss. Out of such information, the present apparatus may automatically identify frequencies or frequency ranges to be adapted, and in particular to be one of amplified or attenuated. Such frequency ranges may accordingly be adapted in the frequency characteristic that will be applied to the audio files.

Figure 7:
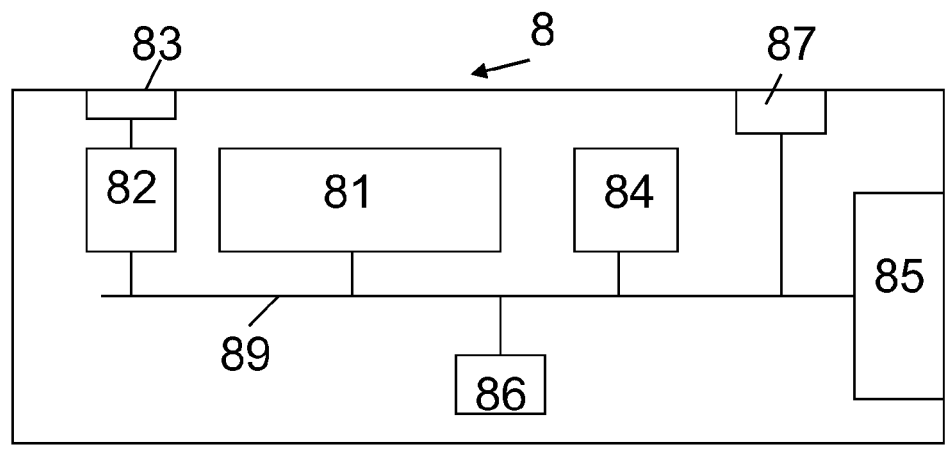

FIG. 7 shows a block diagram of an electronic device according to an embodiment of the present invention, and specifically of a mobile electronic device 8, in a more hardware oriented manner than in block diagrams 2 to 5. The electronic device includes a processing unit 81 which is connected via an internal bus 89 i.a. to a non-volatile memory 84, such as a ROM, which may be implemented, for example, in Flash technology, and to a volatile memory 86, such as a RAM, which may, for example, be implemented in DRAM technology. Reference sign 85 denotes a wireless interface such as a 3G interface for transmitting and receiving data in a wireless manner. The electronic device 8 further includes an digital/analogue converter 82 for supplying an audio output 83 with analogue audio signals. In addition, the electronic device 8 supports a user interface 87 which may be a graphical user interface including a display and some input means.

For example, the wireless interface 85 may be used for receiving audio files from a provider. The user interface 87 may support selection and downloading of audio files via the wireless interface 85. The audio files may be stored in the non-volatile memory 84. In the nonvolatile memory 84, a computer program element may be resident which supports identification of a frequency range of a user's auditory disorder, which allows deriving a frequency characteristic from the identified frequency range, which applies the frequency characteristic to a selected audio file for generating an adapted audio file, and which finally supports playing the adapted audio file. Such computer program element may be loaded into the volatile memory 86 by the processing unit 81 for being executed.

In this context, the user interface 87 may be involved requesting for user input related to the frequency range that matches the tinnitus perception best. In one embodiment, sound samples may be output to the user. Such sound samples may be stored in the non-volatile memory 84 and be output via a D/A converter 82 to the audio output 83 which may be a plug for earphones, for example. Once the frequency range is determined, the processing unit 81 may store this information in one of the memories 84, 86 and may generate, in a specific embodiment, a filter characteristic based on the frequency range. The filter characteristic may be stored in any of the memories 84, 86, and be applied to an audio stream representing an audio file being loaded for being played via the components 82 and 83.

Figure 8:
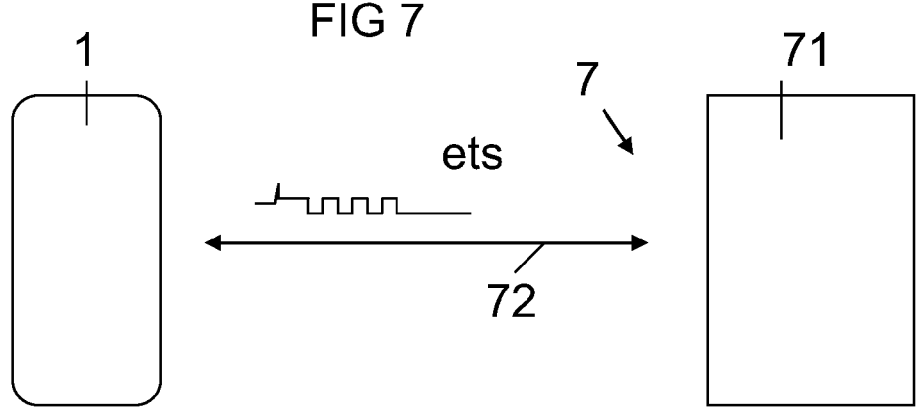

FIG. 8 shows a system 7 for downloading a computer readable element as may be used in the mobile phone 1. The system may include a server 71 including storage means. Reference sign 72 indicates a transmission network, such as the internet. A mobile phone 1 receives the computer readable element, also called "app" in this context, which during transmission is represented by an electrical transmission signal <ets>.

Figure 9:
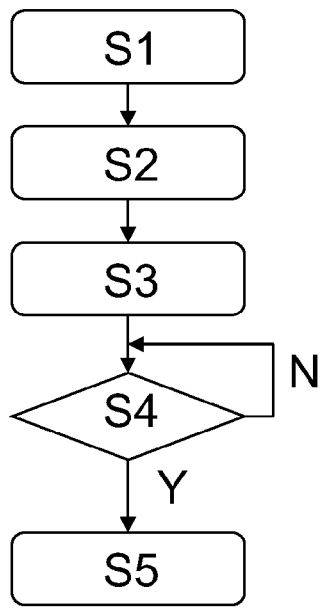

FIG. 9 shows a flow chart of a method according to an embodiment of the present invention. In step S1, the method is started, e.g. by pressing an icon representing the "tinnitus app" on the mobile electronic device. In step S2, the "app" supports identification of a frequency range associated with an auditory disorder of a user of the mobile electronic device, such as referred to in previous embodiments. In step S3 a frequency characteristic of an audio file representing a track of music is adapted subject to the identified frequency range.

In step S4, the electronic device waits for a user input to start playing the adapted audio file. If such input is received (Y), the adapted audio file is played. If it is not received (N), the process may wait for any such input in the future.

Figure 10A:
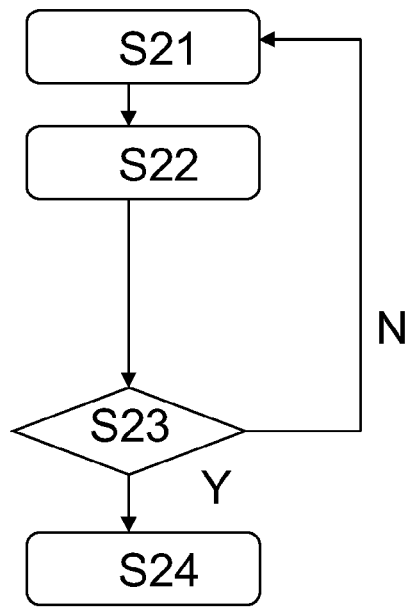

FIG. 10*a* represents a flow chart of an embodiment representing step S2 of FIG. 9 in more detail. In step S21 a first sound sample is selected to be played to the user. In step S22, the selected sound sample is played to the user, and in step S23 it is verified, if a user interface confirms (Y) the sound sample, or denies (N) the sound sample. In case the sound sample is denied (N) in step S23, a different sound sample is selected in step S21 and the process continues. The selection of sound samples may follow a defined sequence of sound samples, or may take user input into account, or even may include modification of existing sound samples according to the user input. In case the sound sample is confirmed (Y) in step S23, the frequency range of the confirmed sound sample is handed over in step S24 to a process generating desired frequency characteristic, which may be represented by step S3 in FIG. 9.

Figure 10B:
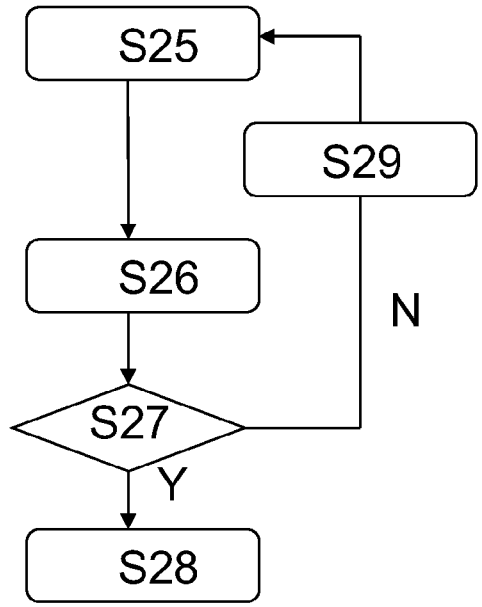

In an alternate process according to FIG. 10*b* representing step S2 of FIG. 9 in more detail, a basic sound sample is determined to be played to the user in step S25. In step S26, the basic sound sample is played to the user, and in step S27 it is verified, if a user interface confirms (Y) the sound sample, or denies (N) the sound sample. In case the sound sample is denied (N) in step S27, a setting to be applied to the basic sound sample is selected in step S29 and is applied to the basic sound sample in step S25 for generating a sound sample different from the basic sound sample. In case the sound sample is confirmed (Y) in step S27, the frequency range of the confirmed sound sample is handed over to a process generating a desired frequency characteristic, which may be represented by step S3 in FIG. 9.

Figure 10C:
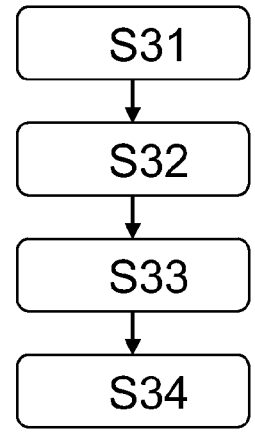

In FIG. 10*c*, the step S3 of FIG. 9 is explained in more detail. In this embodiment, the frequency range is received in step S31. In step S32, a frequency characteristic is determined based on the received frequency range. In step S33, an audio file is selected automatically, or in response to a user input. In step S34 the frequency characteristic is applied to the selected audio file, and the audio file adapted in this way is stored in the electronic device.

While there are shown and described presently preferred embodiments of the invention, it is to be distinctly understood that the invention is not limited thereto but may be otherwise variously embodied and practiced within the scope of the following claims.

The invention claimed is:

1. Apparatus for generating an adapted audio file, comprising
    an identification unit for supporting identification of a frequency range associated with an auditory disorder of a user of the apparatus,
    an adaptation unit for adapting a frequency characteristic of an audio file representing a track of music, wherein the adaptation is subject to the identified frequency range, and
    an audio player for playing the adapted audio file,
    which apparatus is a stand alone mobile electronic device containing the identification unit, the adaptation unit and the audio player in a common housing of the mobile electronic device,
    wherein the adaptation unit is adapted to determine a frequency characteristic based on the identified frequency range to be applied to the audio file for generating the adapted audio file, which determined frequency characteristic represents a band elimination filter characteristic for filtering out the identified frequency range, and
    wherein the adaptation unit is adapted to accentuate frequencies at the edges of an eliminated band.

2. Apparatus according to claim 1, which apparatus is one of a mobile phone, a portable audio player, and a portable computing device.

3. Apparatus according to claim 1, wherein the identification unit is adapted to control the audio player to play sound samples different in at least one of a frequency, a volume, and a sound characteristic.

4. Apparatus according to claim 3, wherein the identification unit comprises a database for storing the multiple sound samples different in at least one of a frequency, a volume, and a sound characteristic.

5. Apparatus according to claim 3, comprising a sound modifier for generating the multiple sound samples different in at least one of a frequency, a volume, and a sound characteristic out of a basic sound sample.

6. Apparatus according to claim 3, comprising a graphical interface for requesting at least one of a confirmation, rejection and modification of the sound sample played.

7. Apparatus according to claim 1, comprising a first selector for selecting one or more audio files to be adapted by the adaptation unit out of a list of audio files stored in the apparatus.

8. Apparatus according to claim 1, comprising a second selector for selecting between playing the audio file or playing the adapted audio file in response to a request for playing a track of music associated with the audio file.

9. Apparatus according to claim 1, comprising a third selector for selecting between playing audio files or playing adapted audio files in response to activating the audio player.

10. Apparatus according to claim 1, comprising a memory for storing the audio file and the adapted audio file.

11. A method for generating an adapted audio file on a mobile electronic device, the mobile electronic device executing the steps of supporting identification of a frequency range associated with an auditory disorder of a user of the mobile electronic device, building a frequency characteristic based on the identified frequency range which built frequency characteristic represents a band elimination filter characteristic for filtering out the identified frequency range, and includes accentuated frequencies at the edges of an eliminated band, adapting a frequency characteristic of an audio file representing a track of music subject to the identified frequency range by applying the built frequency characteristic to the audio file, and playing the adapted audio file.

12. A method according to claim 11, wherein the step of identifying the frequency range includes playing one or more sound samples to the user and in response to receiving a user input determining the frequency range.

13. A method according to claim 11, wherein the step of adapting the frequency characteristic of the audio file includes filtering the audio file in the identified frequency range.

14. A method according to claim 11, wherein the step of adapting the frequency characteristic of the audio file includes suppressing the identified frequency range in the audio file.

15. A non-transitory computer readable medium comprising a computer readable element stored on the non-transitory computer readable medium which computer readable element comprises computer readable code means for performing a method according to claim 11 when executed on a processing unit of the electronic mobile device.

* * * * *